US012654230B2

(12) United States Patent
Zhang et al.

(10) Patent No.: US 12,654,230 B2
(45) Date of Patent: Jun. 16, 2026

(54) CUTTING TOOL MOUNTING ASSEMBLY WITH SPLIT, MODULAR AND WIRELESS WEAR DETECTION SYSTEM

(71) Applicant: KENNAMETAL INC., Latrobe, PA (US)

(72) Inventors: Shuangyuan Zhang, Shanghai (CN); Hongyu Zhou, Shanghai (CN); Yu Liu, Shanghai (CN); Xiaofeng Yu, Shanghai (CN); Zhiquan Guo, Shanghai (CN)

(73) Assignee: KENNAMETAL INC., Latrobe, PA (US)

( * ) Notice: Subject to any disclaimer, the term of this patent is extended or adjusted under 35 U.S.C. 154(b) by 405 days.

(21) Appl. No.: 18/095,265

(22) Filed: Jan. 10, 2023

(65) Prior Publication Data

US 2023/0219141 A1     Jul. 13, 2023

(30) Foreign Application Priority Data

Jan. 11, 2022    (CN) .......................... 202210026643.8

(51) Int. Cl.
   *E21C 35/18*       (2006.01)
   *B23B 3/26*       (2006.01)
          (Continued)

(52) U.S. Cl.
   CPC ................ *B23B 25/06* (2013.01); *B23B 3/26* (2013.01); *E21C 35/18* (2013.01); *E21C 35/302* (2023.05);
          (Continued)

(58) Field of Classification Search
   CPC ........ E21C 35/18; E21C 35/19; E21C 35/191; E21C 35/193; E21C 35/197; E21C 35/302; B23B 25/06
          (Continued)

(56) References Cited

U.S. PATENT DOCUMENTS

| | | | |
|---|---|---|---|
| 11,499,899 B2* | 11/2022 | Schwalbach | ............ E21C 25/10 |
| 2013/0035875 A1* | 2/2013 | Hall | ...................... E01C 23/088 |
| | | | 702/34 |

(Continued)

FOREIGN PATENT DOCUMENTS

| | | |
|---|---|---|
| DE | 202018100361 U1 | 1/2018 |
| DE | 102018115959 A1 | 1/2020 |
| DE | 102021126279 A1 | 4/2023 |

OTHER PUBLICATIONS

DE 202018100361 (Year: 2018).*

(Continued)

*Primary Examiner* — Sunil Singh
(74) *Attorney, Agent, or Firm* — Christopher J. Owens

(57) ABSTRACT

A cutting tool mounting assembly includes a base that defines a receptacle. A bushing is configured to be received in the receptacle and includes an aperture. A rotatable cutting tool is received in the aperture of the bushing. The rotatable cutting tool includes a cutting tip. The cutting tool mounting assembly includes a split, modular and wireless wear detection system including a target proximate the cutting tip for emitting a signal representative of the wear of the cutting tip, a sensor element for detecting the signal emitted by the target at a spaced apart location with respect to the target, a data recording and data transmitting device for recording data from the sensor element and for wirelessly communicating the data to a processor and/or a display device.

17 Claims, 4 Drawing Sheets

(51) Int. Cl.
B23B 25/06 (2006.01)
E21C 35/00 (2006.01)

(52) U.S. Cl.
CPC . *B23B 2200/0461* (2013.01); *B23B 2260/128*
(2013.01); *B23B 2260/144* (2013.01)

(58) Field of Classification Search
USPC ................................................. 299/102–110
See application file for complete search history.

(56) References Cited

U.S. PATENT DOCUMENTS

2017/0342831 A1 * 11/2017 Weber ..................... E21C 35/19
2021/0331669 A1 * 10/2021 Graham ............. B60W 30/0956
2024/0410278 A1 * 12/2024 Bretschneider ......... E21C 39/00

OTHER PUBLICATIONS

Mar. 20, 2024 Foreign Office Action German Application No. DE102023200147.0, 12 pages.
Oct. 24, 2024 Foreign Office Action Chinese Application No. CN20221026643, 2 Pages.

* cited by examiner

CUTTING TOOL MOUNTING ASSEMBLY WITH SPLIT, MODULAR AND WIRELESS WEAR DETECTION SYSTEM

RELATED APPLICATION DATA

The present application claims priority pursuant to 35 U.S.C. § 119(a) to Chinese Patent Application Number 202210026643.8 filed Jan. 11, 2022, which is incorporated herein by reference in its entirety.

FIELD

In general, the disclosure pertains to a cutting tool mounting assembly that includes a rotatable cutting tool that is useful for the impingement of earth strata such as, for example, asphaltic roadway material, concrete, coal deposits, mineral formations and the like. More specifically, the disclosure pertains to a cutting tool mounting assembly with a smart rotatable cutting tool with a target and sensor element for monitoring and predicting wear in real time using a split, modular and wireless design.

BACKGROUND

Rotatable and/or non-rotatable cutting tools, such as cutting tools with cutting tips, and the like, are used in conjunction with a drum/machine to break up (or cut) a substrate such as coal, rock, mineral asphalt pavement, asphaltic concrete, concrete or the like. In its very basic design, such a machine includes a driven member (e.g., a chain, a wheel or a drum), a block and/or holder either directly or indirectly mounted to the driven member, a rotatable or non-rotatable cutting tool held in the block/holder, and typically a bushing element therebetween. It is the cutting tool that impinges the substrate so as to break the substrate into pieces upon impact.

In a typical cutting tool, super hard materials, such as tungsten carbide, diamond, polycrystal diamond, cubic boron nitride (c-BN), carbon nitrides, and the like, are typically used as the cutting tip to perform the cutting, and relatively softer materials, such as steel, and the like, are used as the base body of the cutting tool.

During the cutting process, there will be wear developing at the cutting tip. If the cutting tip is worn extensively, the cutting tip will deteriorate the cutting performance and slow down the cutting speed. In severe cases, it will lead to catastrophic failures of the cutting tip and potentially damage the drum/machine. Therefore, the cutting tips are periodically replaced.

Currently, these periodic replacements are scheduled based on past empirical data. Unfortunately, these data do not reflect the actual wear and performance of the cutting tip. As a result, there will be instances the cutting tip may be prematurely replaced, or the cutting tip may not be replaced before it is completely worn and drum/machine damage may occur.

Accordingly, an improved cutting tool assembly, rotatable cutting tool and/or related components that can accurately monitor and predict wear, usage, and/or other operating parameters in real time would be highly desirable.

SUMMARY

The problem of monitoring and predicting wear in real time of rotatable cutting tool for use in underground mining and road construction is solved by providing a split, modular and wireless wear detection system comprising a target that emits a signal and a sensor element spaced apart from the target for detecting the signal emitted by the target.

The split, modular and wireless detection system of the disclosure comprises four basic components as follows:

(1) a target for emitting a signal representative of the wear of the cutting tip;

(2) a sensor element for detecting the signal emitted by the target at a spaced apart location with respect to the target;

(3) a data recording and transmitting device for recording the signal from the sensor element and for communicating the recorded signal wirelessly to a processor and/or a display device; and (4) a power source, such as a battery, and the like, for providing power to the various components mentioned above, if necessary.

Some targets include, but are not limited to, magnetic materials (neodymium magnet/super magnet), fluorescent materials, coloring materials, labeling chemical gases/liquids, radioactive materials, etc. Some typical sensors include, but are not limited to, magnetic field sensors (e.g., magnetometer), fluorescent sensors, color camera, chemical sensors, radiation detectors, etc. The system further comprises software algorithm/models to correlate the signals/data into tool wear, and a graphic user interface (GUI) to display, analyze, record results both locally and in cloud/edge services.

Depending on the target-sensor signal patterns or strength, the software algorithm/models further provide the tool wear status in real-time, e.g., 50% worn, 80% worn, 100% worn. The targets are firmly secured into the cutting tip or cutting tool body and physically separated from the rest of system. For easy deployment and enhanced safety requirement, the hardware does not require external wires connected to the targets. The sensors, data logger, data transmitters, and power source are devised with a modular design, which can be mounted to the cutting tool base or drum/machine and can be plugged in/out (e.g., plug and play) with standard connections points.

In one aspect, a cutting tool mounting assembly is adapted for attachment to a surface of a rotatable driving member of a cutting tool machine. The cutting tool mounting assembly comprises a base including a bottom surface and a front portion that defines a receptacle; a bushing configured to be received in the receptacle of the base, the bushing including a forward face that defines an aperture; and a rotatable cutting tool received in the aperture of the bushing. The rotatable cutting tool includes a cutting tip. The cutting tool mounting assembly further comprises a split, modular and wireless detection system comprising a target proximate the cutting tip for emitting a signal representative of wear of the cutting tip; a sensor element for detecting the signal emitted by the target at a spaced apart location with respect to the target; a data recording and data transmitting device for recording the signal from the sensor element and for wirelessly communicating the recorded signal to a processor and/or a display device.

In another aspect, a rotatable cutting tool for a cutting tool mounting assembly comprises a cutting tool body has an axial forward end and an axial rearward end, a head portion axially rearward of the axial forward end and a collar portion axially rearward of the head portion. A shank portion is axially rearward of the collar portion and axially forward of the axial rearward end. A cutting tip is at the axial forward end of the head portion. A target is proximate the cutting tip for emitting a signal representative of the wear of the cutting tip. A sensor element is at a spaced apart location with respect to the target for detecting the signal emitted by the target. A data recording and data transmitting device records data from the sensor element and wirelessly communicates a signal to a processor and/or a display device.

As used herein, directional phrases, such as, for example, left, right, front, back, top, bottom and derivatives thereof, relate to the orientation of the elements shown in the drawings and are not limiting upon the claims unless expressly recited therein. Identical parts are provided with the same reference number in all drawings.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Throughout the text and the claims, use of the word "about" in relation to a range of values (e.g., "about 22 to 35 wt %") is intended to modify both the high and low values recited, and reflects the penumbra of variation associated with measurement, significant figures, and interchangeability, all as understood by a person having ordinary skill in the art to which this disclosure pertains.

For purposes of this specification (other than in the operating examples), unless otherwise indicated, all numbers expressing quantities and ranges of ingredients, process conditions, etc., are to be understood as modified in all instances by the term "about". Accordingly, unless indicated to the contrary, the numerical parameters set forth in this specification and attached claims are approximations that can vary depending upon the desired results sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Further, as used in this specification and the appended claims, the singular forms "a", "an" and "the" are intended to include plural referents, unless expressly and unequivocally limited to one referent.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements including that found in their measuring instrument. Also, it should be understood that any numerical range recited herein is intended to include all sub-ranges subsumed therein. For example, a range of "1 to 10" is intended to include all sub-ranges between and including the recited minimum value of 1 and the recited maximum value of 10, i.e., a range having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

BRIEF DESCRIPTION OF THE DRAWINGS

While various embodiments of the disclosure are illustrated, the particular embodiments shown should not be construed to limit the claims. It is anticipated that various changes and modifications may be made without departing from the scope of this disclosure.

DETAILED DESCRIPTION

Figure 1:
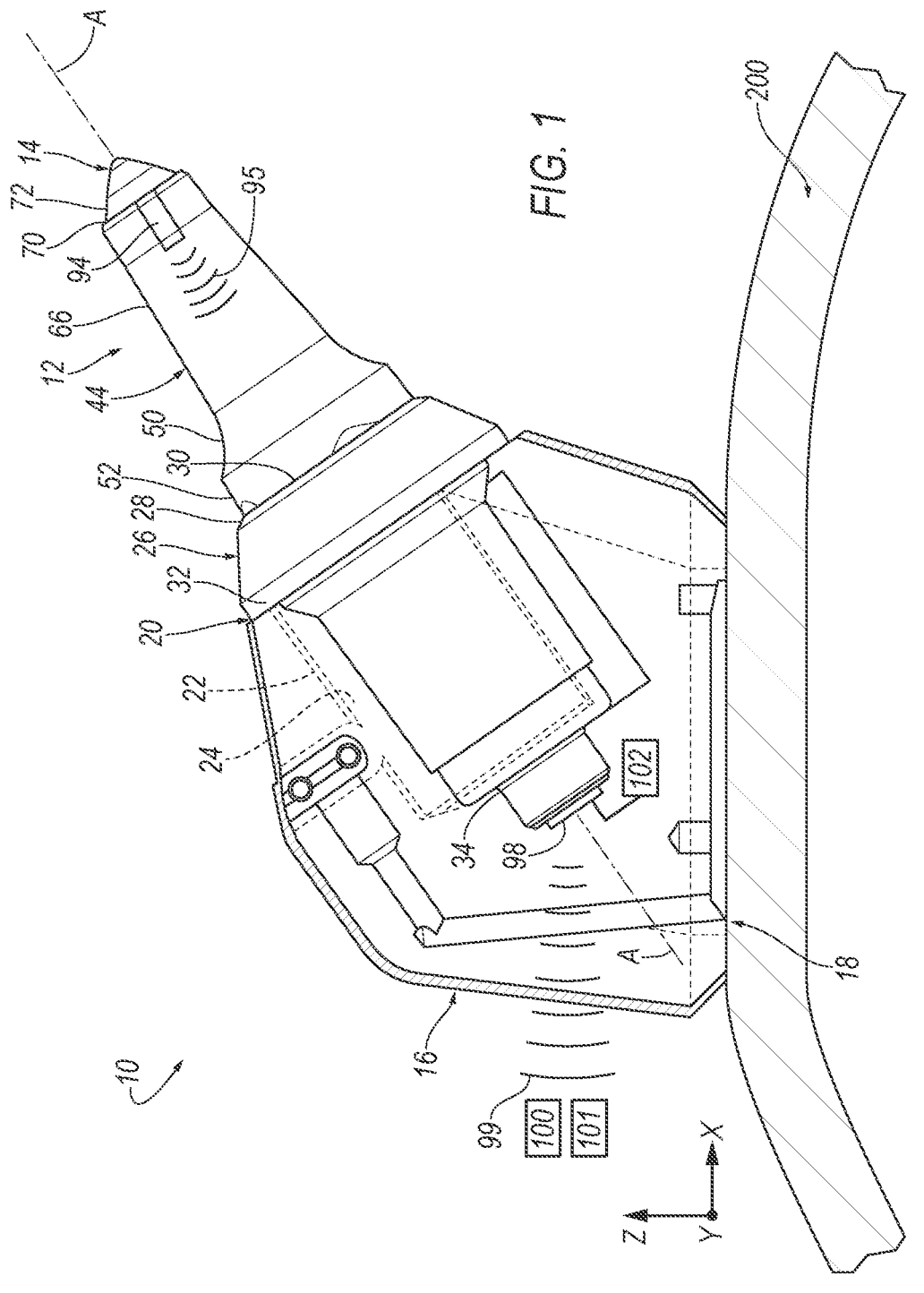
FIG. 1 is a partial cross-sectional side view of a cutting tool mounting assembly with a split, modular and wireless wear detection system according to an embodiment of the disclosure.

FIG. 1 shows a cutting tool assembly or cutting tool mounting assembly, generally designated as reference number 10, in accordance with various aspects of the disclosure. As will be apparent following a description of the invention herein, when referring generally to a "cutting tool mounting assembly" adapted for attachment to a surface of a rotatable driving member of a cutting tool machine the invention generally includes, for example, a base configured for attachment to the surface of the rotatable driving member, bushing configured for receipt in the base and a cutting tool configured for receipt in the bushing. For simplification of description of the invention herein, these aspects of the invention may be generally referred to as an "assembly."

It will be appreciated that the disclosure has application to various kinds of cutting tools useful in various kinds of cutting operations. Exemplary operations include, without limitation, road planning (or milling), coal mining, concrete cutting, and other kinds of cutting operations wherein a cutting tool with a hard cutting member impinges against a substrate (e.g., earth strata, pavement, asphaltic highway material, concrete, minerals and the like) breaking the substrate into pieces of a variety of sizes including larger-size pieces or chunks and smaller-sized pieces including dust-like particles. In addition, it will be appreciated that the cutting tool mounting assembly 10 of the invention, and components thereof, may be manufactured in various sizes and dimensions depending upon the desired application of the assembly 10.

Referring to FIG. 1, there is illustrated in detail the cutting tool mounting assembly 10 and various components of the disclosure. The cutting tool mounting assembly 10 is adapted for attachment to a surface of a rotatable driving member 200 of a cutting machine (not shown) such as, for example, a mining machine. The cutting tool mounting assembly 10 is attached or connected to the rotatable driving member such as, for example, a rotating drum, and the like, by methods well known in the art such as, for example, welding, and the like.

The cutting tool mounting assembly 10 is configured for mounting or receiving a rotatable cutting tool 12 with a hard cutting tip or cutting insert 14 for impinging against a substrate, e.g., earth strata, pavement, asphaltic highway material, concrete, minerals and the like, as is well known in the art. The cutting tool mounting assembly 10 includes a base 16. The base 16 includes a bottom surface or bottom portion 18 and a front portion 20 that defines a receptacle 22. The receptacle 22 includes an inner surface or inner wall 24.

The cutting tool mounting assembly 10 also includes a bushing 26 configured to be received in the receptacle 22 of the base 16. Typically, the bushing 26 is press fit into the receptacle 22 of the base 16. In one aspect, the bushing 26 is configured to be releasably received in the receptacle 22 so that the bushing 26 receives most of the impact and wear from the cutting tool 12 during operation and therefore reduces or minimizes wear on the base 16. Then, the bushing 26 can be removed and replaced as needed.

The bushing 26 includes a forward face 28 that defines an aperture 30 for receiving the rotatable cutting tool 12. In addition, the bushing 26 includes a shoulder 32 generally opposite the forward face 28. The shoulder 32 is configured for cooperating with the front portion 20 of the base 16. The bushing 26 also includes a shank portion 34 extending generally rearward from the shoulder 32. In one aspect, the shank portion 34 has an outer surface configured for cooperating with the inner wall 24 of the receptacle 22 when the bushing 26 is inserted in the receptacle 22. In another aspect, the shank portion 34 is generally cylindrical. However, the shank portion 34 can be other shapes such as, for example, triangular or quadrilateral as well.

In the illustrated embodiment, the cutting tool mounting assembly 10 has a central, longitudinal axis A-A passing centrally through the aperture 30 of the bushing 26 and the receptacle 22 of the base 16.

Figure 2:
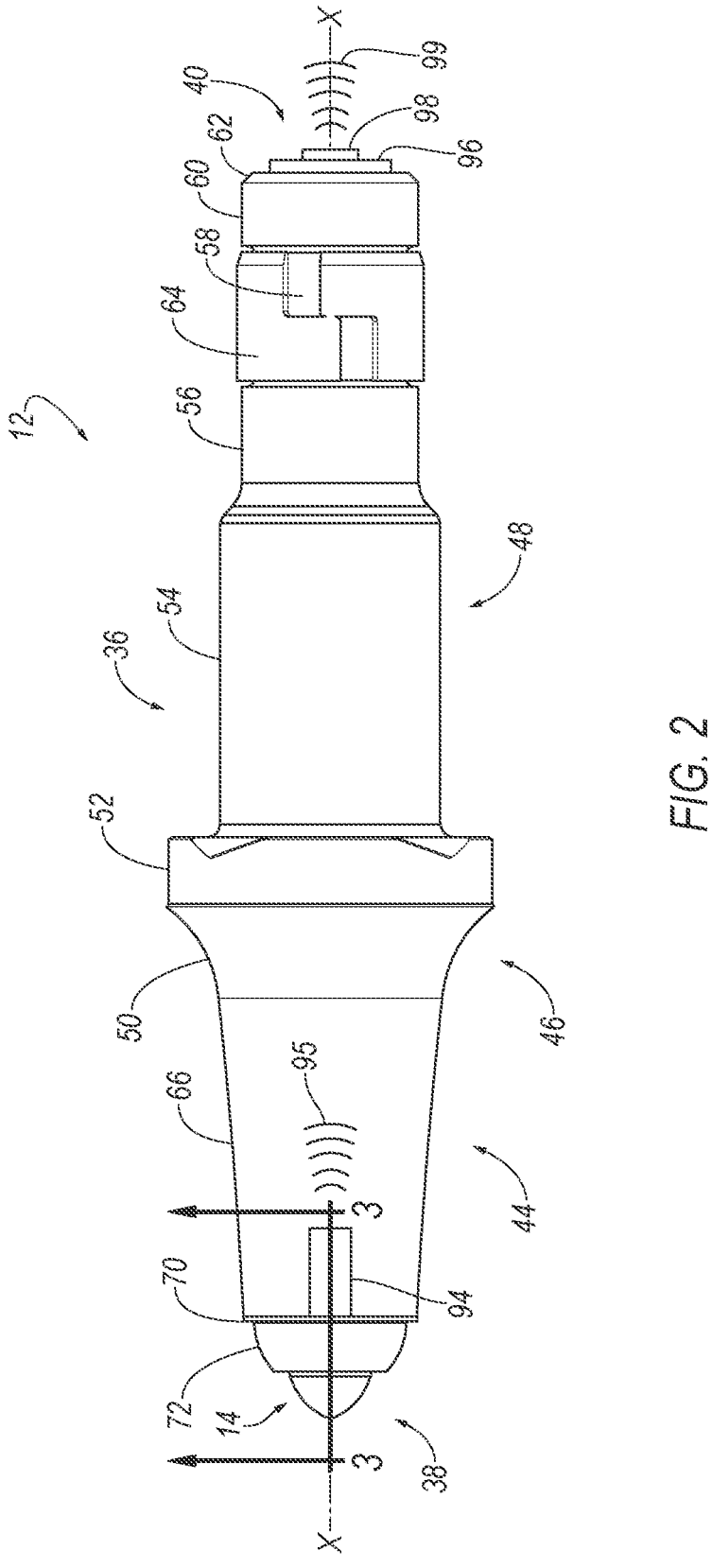
FIG. 2 is a side view of a rotatable cutting tool for use in the cutting tool mounting assembly of FIG. 1 showing a target and a sensor element of the split, modular and wireless wear detection system according to an embodiment of the disclosure.
Figure 3:
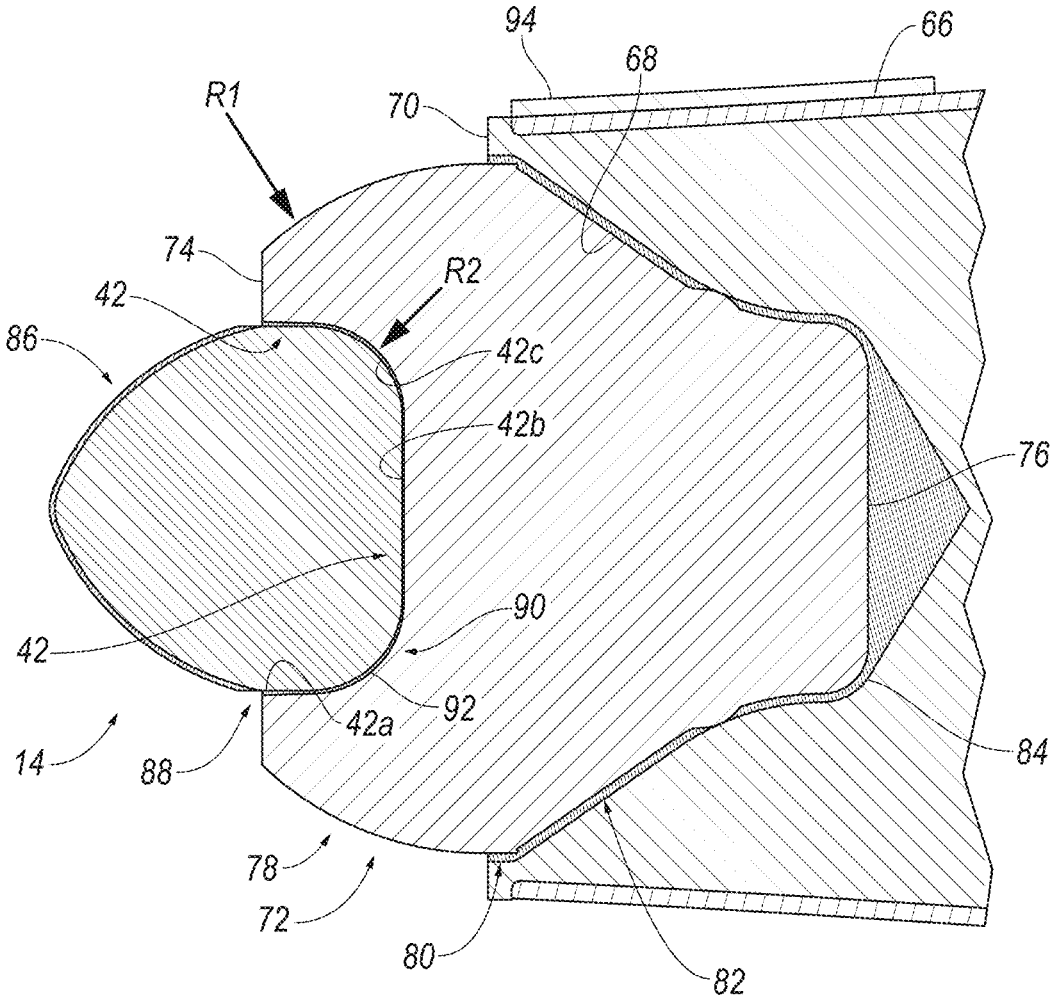
FIG. 3 is a cross-sectional view of the cutting insert, bolster and head portion of the rotatable cutting tool taken along line 3-3 of FIG. 2.

Referring now to FIGS. 2 and 3, the rotatable cutting tool 12 is configured for being mounted on or otherwise received in the cutting tool mounting assembly 10.

In general, the rotatable cutting tool 12 comprises an elongate cutting tool body, generally designated as 36. The cutting tool body 36 is typically made of steel, such as Mn—B steel alloy, and the like. The cutting tool body 36 has an axial forward end 38 and an axial rearward end 40. The hard cutting tip or cutting insert 14 is affixed (such as by brazing or the like) into a socket 42 in the axial forward end 38 of the cutting tool body 36.

The cutting tool body 36 is divided into three principal portions: a head portion 44, a collar portion 46 and a shank portion 48. The most axial forward portion is the head portion 44 that begins at the axial forward end 38 and extends along the longitudinal axis X-X in the axial rearward direction. The mediate portion is the collar portion 46 that begins at the juncture with the head portion 44 and extends along the longitudinal axis X-X in the axial rearward direction. The collar portion 46 comprises a tapered neck section 50 followed by a cylindrical collar section 52.

The most axial rearward portion is the shank portion 48 that begins at the juncture with the collar portion 46 and extends along the longitudinal axis X-X in the axial rearward direction. The shank portion 48 comprises a forward cylindrical tail section 54, followed by a mid-section 56, followed by a retainer groove 58, followed by a rearward cylindrical tail section 60 and terminating in a beveled section 62. As is known by those skilled in the art, the shank portion 48 is the portion of the cutting tool body 36 that carries a retainer 64. The retainer 64 rotatably retains the rotatable cutting tool 12 in the cutting tool mounting assembly 10.

Still referring to FIGS. 2 and 3, the head portion 44 includes a base portion 66 that is affixed to the collar portion 46. As illustrated in FIGS. 2 and 3, the base portion 66 of the head portion 44 is formed with a pocket, shown generally at 68. In one aspect, the pocket 68 extends axially along axis X-X from an axial forward end 70 of the base portion 66 rearwardly toward the collar portion 46.

A bolster 72 is at least partially received in the pocket 68 of the base portion 66. The bolster 72 is made of a suitable material, such as cemented metal carbide material comprising about 1 to 40 percent concentration of cobalt by weight, preferably 5 to 10 percent. In one aspect, the cutting insert 14 is affixed to the bolster 72.

The bolster 72 has an axial forward end 74 and an axial rearward end 76. The bolster 72 is divided into three principal portions; namely, a convex-shaped head portion 78, a collar portion 80 and a tapered shank portion 82 that terminates in a beveled portion 84. The most axial forward portion is the convex-shaped head portion 78 that begins at the axial forward end 75 and extends along longitudinal axis X-X in the axial rearward direction. In one embodiment, the convex-shaped head portion 78 is formed with a radius, R1, of about 0.54 in (13.8 mm). The mediate portion is the collar portion 80 that begins at the juncture with the head portion 78 and extends along the longitudinal axis X-X in the axial rearward direction to the tapered shank portion 82. The convex-shaped head portion 78 of the bolster 72 includes the socket 42 for receiving the cutting insert 14. The socket 42 is formed with a substantially planar side wall 42a, a substantially planar bottom wall 42b, and a radius blend 42c extending between the side wall 42a and the bottom wall 42b. In one embodiment, the radius blend 42c is formed with a radius, R2, of about 0.157 in (4.00 mm).

The hard cutting tip or cutting insert 14 is divided into three principal portions: a convex-shaped conical head portion 86, a collar portion 88 and an axially rearward portion 90 that terminates in a beveled section 92. The most axial forward portion is the convex-shaped head portion 86 that extends in the axial rearward direction. The mediate portion is the collar portion 88 that begins at the juncture with the head portion 86 and extends in the axial rearward direction to the axially rearward portion 90.

As mentioned above, one aspect of the disclosure is that the cutting tool mounting assembly 10 includes a split, modular and wireless wear detection system. The split, modular and wireless wear detection system comprises three basic components as follows:

(1) a target 94 for emitting a signal 95 representative of the wear of the cutting tip 14;

(2) a sensor, a sensor element, a sensor assembly or like comparable device 96 for detecting the signal 95 emitted by the target 94 at a spaced apart location with respect to the target 94; and (3) a data recording and data transmitting device 98 for recording the signal 95 from the sensor element 96 and for wirelessly communicating a signal 99 to a processor 100 and/or a display device 101.

Figure 4:
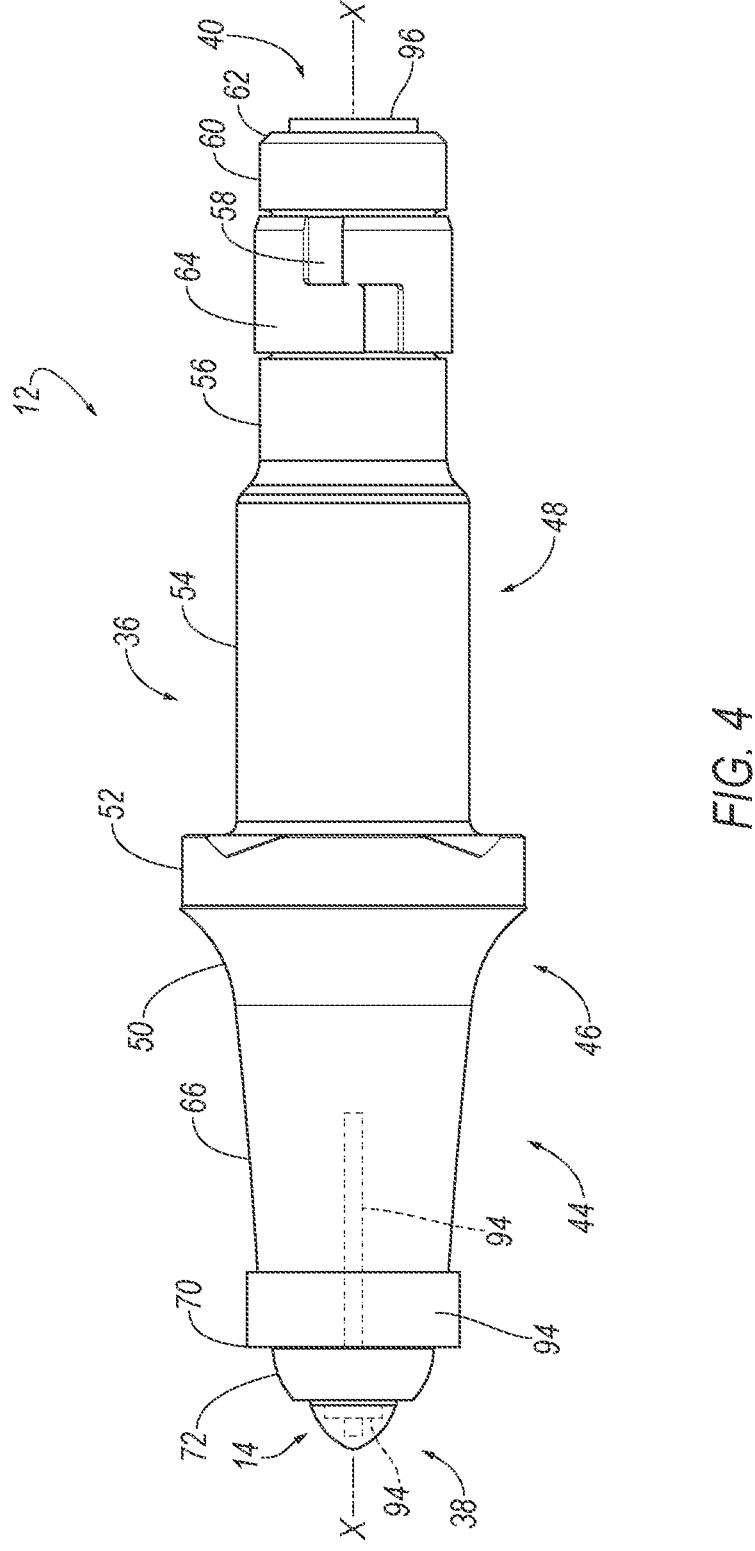
FIG. 4 is another side view of the rotatable cutting tool of FIG. 2 showing the different locations for the target.

The target 94 can be any size, shape and material, and can be located at any desirable location, so long as the target 94 can emit a signal representative of the wear of the cutting tip 14. For example, the target 94 can be rectangular-shaped and mounted on the base portion 66 proximate the cutting tip 14, as shown in FIGS. 2 and 3. In another example, the target 94 can be in the shape of a ring and mounted on the base portion 66 proximate the cutting tip 14, as shown in FIG. 4. In yet another example, the target 94 may be located internally in the rotatable cutting bit 12, as shown in phantom in FIG. 4. In still yet another example, the target 94 may be interspersed into the cutting tip 14 itself, as shown in FIG. 4.

The material of the target 94 may include, but is not limited to, magnetic materials (neodymium magnet/super magnet), fluorescent materials, coloring materials, labeling chemical gases/liquids, radioactive materials, or any combination thereof. Some typical sensor elements include, but are not limited to, magnetic field sensors (e.g., magnetometer), fluorescent sensors, color camera, chemical sensors, radiation detectors, or any combination thereof. The detection system further comprises software algorithm/models to correlate the signals/data into tool wear, and a Graphical User Interface (GUI) (not shown) to display, analyze and record results, both locally and in cloud/edge services.

Depending on the target-sensor signal patterns or strength, the software algorithm/models further provide the tool wear status in real-time, e.g., 50% worn, 80% worn, 100% worn. Ideally, the target 94 is firmly secured proximate the cutting tip 14 and is physically separated from the rest of detection system. For easy deployment and enhanced safety requirement, the hardware does not require external wires connected to the target 94. The sensor 96, the data recording and data transmitting device 98 and the power source 102 are devised with a modular design, which can be mounted at any desirable spaced apart location with respect to the target 94, for example, the base 16, the drum/machine 200, and the like, and can be plugged in/out (e.g., plug and play) with standard connections points.

As shown in FIGS. 1-3, the target 94 comprises a magnetic material, for example, a neodymium magnet/super magnet that is attached proximate the cutting tip 14. In the illustrated embodiment, the target 94 is attached to base portion 66 of the rotatable cutting tool 12 proximate the cutting tip 14 and the bolster 72. It will be appreciated that the target 94 can be placed at any desirable location on the head portion 44 of the rotatable cutting tool 12 so long as the target 94 provides a signal representative of the amount of wear of the cutting tip 14. For example, the target 12 can be mounted to the cutting tip 14, the bolster 72, the mid-section 56, the tapered neck section 50, or any combination thereof.

In the illustrated embodiment, the target 94 is mounted adjacent to the cutting tip 14 of the rotatable cutting tool 12. However, it will be appreciated that the target 94 can be integrally formed with or embedded into any desirable location of the head portion 44 of the rotatable cutting tool 12, so long as the target 94 provides a signal 95 representative of the amount of wear of the cutting tip 14. For example, the target 94 can be interspersed with the cutting tip 14 itself.

The sensor element 96 can be any suitable component that detects the signal 95 emitted by the target 94. In the illustrated embodiment, for example, the target 94 emits a signal (95) in the form of a magnetic field. Thus, the sensor element 96 comprises a magnetic field sensor capable of detecting the signal 95 wirelessly emitted from the target 94.

The sensor element 96 can be located at any location that is spaced apart from the target 94, so long as the signal 95 provided by the target 94 can be detected. It should be noted that the signal 95 provided to the sensor element 96 from the target 94 can be wireless, as shown in FIGS. 1 and 2, or the signal 95 can be wired directly to the sensor element 96. In the illustrated embodiment in which the target 94 emits the signal 95 in the form of a magnetic field, the magnetic field sensor 96 can be attached to the rearward end 40 of the rotatable cutting tool 12, as shown in FIG. 2. In this example, the magnetic field sensor 96 can detect the signal 95 emitted by the target 94 in the form of a magnetic field that is wirelessly transmitted through the rotatable cutting tool 12, thereby providing a very accurate indication of the signal 95 emitted by the target 94 (and the percentage of wear of the cutting tip 14). Alternatively, the magnetic field sensor 96 can be attached to any desirable location of the cutting tool mounting assembly 10 spaced apart from the target 94, such as, the base 16, the shank portion 34, and the like. Attaching the sensor element 96 at a spaced apart location with respect to the target 94 provides a split, modular and wireless design.

The data recording and data transmitting device 98 is configured to receive data from the sensor element 96 and for wirelessly transmitting a signal 99 representing any data received from the sensor element 96. In one embodiment, the data recording and data transmitting device 98 is mounted to the rearward end 40 of the rotatable cutting tool 12, as shown in FIG. 2. In another embodiment, the data recording and data transmitting device 98 is mounted to the shank portion 34 of the cutting tool mounting assembly 10, as shown in FIG. 1. In yet another embodiment, the data recording and data transmitting device 98 can be mounted to the base 16 of the cutting tool mounting assembly 10. In still yet another embodiment, the data recording and data transmitting device 98 is integrated with the sensor element 96.

The data recording and data transmitting device 98 wirelessly communicates the signal 99 of the data received from the sensor element 96 to a processor 100 and/or display device 101, as shown in FIG. 1. The processor 100 and/or display device 101 acts as a means for processing and displaying data from the sensor element 96. The processor 100 and/or display device 101 can be any suitable type of computer, tablet or general processing device. The data recording and data transmitting device 98 can, in some embodiments, include a base station or other relay point (not shown) that may initially receive sensor data and then relay/transmit the same to the processor 100 and/or display device 101 via a wireless connection.

As is known in the art, a power source 102, such as a battery, and the like, can be in electrical communication with and provides power to the sensor element 96 and the data recording and data transmitting device 98. Ideally, the power source 102 is located in close proximity to the sensor element 96 and/or the data recording and data transmitting device 98.

As described above, the split, modular and wireless design of the wear detection system of the cutting tool mounting assembly 10 of the disclosure has several technical advantages as compared to conventional detection systems. These technical advantages are as follows:

1. The split structure provides with the combination of a target spaced apart from the sensor element provides a secure and accurate detection the amount of wear of the cutting tip.

Current smart systems rely on sensors to detect general physical signals such as vibration, temperature, power, force, torque during the cutting processes; and correlate these signals with tool wears. As described above, split structures with targets and sensors combination are used. Instead of detecting general signals as in conventional arrangements, the sensors detect the targets in the disclosure. This one-on-one detection establishes a secure and accurate correlation. In one example, a target, such as a super magnet, are embedded at the base of the cutting tip. The sensor, such as magnetometer, can detect the target and generate corresponding signals. When the cutting tips are worn out, the target is worn out too. The sensor will lose the signals from the target and alert the operator of the tool wear.

2. The selection of a robust material for the target will compliment the mechanical properties of the cutting tool and withstand harsh working conditions.

Most sensors are fragile, and brittle compared with materials made up the cutting tool, i.e., tungsten carbide, steel. Having sensors in the cutting tool will mechanically deteriorate the cutting tip and cause a poor cutting performance and tool life. In addition, cutting tools are used in underground mining or road construction, which are very harsh working conditions. Normal sensors suffer from early failures in such working conditions. However, the selection of a robust target material can overcome this challenge. For example, magnetic materials are mechanically comparable with existing composition of the cutting tool, such as steel, and therefore can be integrated (e.g., welding) directly into the rotatable cutting tool. In addition, other targets, such as fluorescent materials, coloring materials, labeling chemical gases/liquids, radioactive materials, and the like, can be mixed with the composition of the rotatable cutting tool, and in particular, the cutting tip. Further, the amount of target materials required is small, in the range of mini grams to 10s of grams, depending on the sensitivity of the target material.

3. Real time tool wear monitoring and prediction with high accuracy, wide usability, and tool wear status in percentage.

Through the unique split design, the disclosure is able to receive much sensitive and useful signals. These signals are wirelessly transmitted to a computing unit (i.e., a processor). Software algorithm/models in the computing unit are able to correlate the signals into cutting tool wear at real time with high accuracy and wide user scenarios, e.g., with different machines, drums, cutting tools, cutting parameters, work materials, and the like. Depending on the signal patterns and/or strength, software algorithm/models further provide the status of the tool wear in percentage to the operator.

4. Fully wireless systems that does not require external connections and minimizes destruction to existing structures.

Generally, in order to monitor tool wear accurately, sensors are required to be placed in close proximity to the cutting zone and there is restriction of space and power. By contrast, the system of the disclosure utilizes target-sensor coupling. As a result, there is no requirement to provide power to targets and the target-sensor communication can be done wirelessly. There are several technical advantages to this innovative approach: (1) the targets can be placed close to cutting areas so as to accurately monitor the cutting process; (2) sensors and all other systems can be placed distal to the cutting tip, for example, at the rear end of the cutting tool so as to avoid space limitation and power constraints. This will further reduce the manufacturing cost because there is minimum destruction to existing structures.

5. A modular design for easy plug-in/out, which can be easily be replaced and applied at different user cases.

The back end of the detection system (i.e., sensor, data logger, data transmitter, battery) provides a modular design, in which they have standard size and connection points. These enable them to be easily mounted onto the base or drum/machine. This allows deployments of this system into different underground mining and road constructions systems and scenarios, which broaden the application of the system of the disclosure by the operator.

Having described presently preferred embodiments the disclosure may be otherwise embodied within the scope of the appended claims.

PARTS LIST

| 10 | cutting tool mounting assembly |
|---|---|
| 12 | cutting tool |
| 14 | hard cutting tip (cutting insert) |
| 16 | base |
| 18 | bottom portion |
| 20 | front portion |
| 22 | receptacle |
| 24 | inner surface |
| 26 | bushing |
| 28 | forward face |
| 30 | aperture |
| 32 | shoulder |
| 34 | shank portion |
| 36 | cutting tool body |
| 38 | axial forward end |
| 40 | axial rearward end |
| 42 | socket |
| 42a | planar side wall |
| 42b | planar bottom wall |
| 42c | radius blend |
| 44 | head portion |
| 46 | collar portion |
| 48 | shank portion |
| 50 | tapered neck section |
| 52 | cylindrical collar section |
| 54 | cylindrical tail section |
| 56 | mid-section |
| 58 | retainer groove |
| 60 | cylindrical tail section |
| 62 | beveled section |
| 64 | retainer |
| 66 | base portion |
| 68 | pocket |
| 70 | axial forward end |
| 72 | bolster |
| 74 | axial forward end |
| 76 | axial rearward end |
| 78 | convex-shaped head portion |
| 80 | collar portion |
| 82 | tapered shank portion |
| 84 | beveled portion |
| 86 | conical head portion |
| 88 | collar portion |
| 90 | axially-rearward portion |
| 92 | beveled section |
| 94 | target |
| 95 | signal |
| 96 | sensor element |
| 98 | data logger and/or data transmitter |
| 99 | signal |
| 100 | processor |
| 101 | display device |
| 102 | power source |
| 200 | rotating drum |
| A-A | central, longitudinal axis |
| X-X | central, rotational axis |

The invention claimed is:

1. A cutting tool mounting assembly adapted for attachment to a surface of a rotatable driving member of a cutting tool machine, the cutting tool mounting assembly comprising:

a base including a bottom surface and a front portion that defines a receptacle;

a bushing configured to be received in the receptacle of the base, the bushing including a forward face that defines an aperture;

a rotatable cutting tool received in the aperture of the bushing, the rotatable cutting tool including a cutting tip;

a cutting tool body, the cutting tool body having an axial forward end and an axial rearward end, a head portion axially rearward of the axial forward end and having a base portion, a collar portion axially rearward of the head portion, and a shank portion axially rearward of the collar portion and axially forward of the axial rearward end;

a bolster at least partially received in the head portion, the bolster including a socket, wherein the cutting tip is at least partially received in the socket of the bolster; and a split, modular and wireless detection system comprising:

a target for emitting a signal representative of wear of the cutting tip;

a sensor element at a spaced apart location with respect to the target for detecting the signal emitted by the target;

a data recording and data transmitting device for recording data from the sensor element and for wirelessly communicating a signal to a processor and/or a display device, wherein the target is mounted either at an axial forward end of the base portion proximate the bolster and the cutting tip, located internally in the cutting tip or interspersed into the cutting tip.

2. The cutting tool mounting assembly of claim 1, wherein the signal emitted by the target is wirelessly detected by the sensor element.

3. The cutting tool mounting assembly of claim 1, wherein the sensor element is located at the axial rearward end of the cutting tool body.

4. The cutting tool mounting assembly of claim 1, wherein the target comprises one of a magnetic material, a fluorescent material, a coloring material, a labeling chemical gases/liquids material, a radioactive material, or any combination thereof.

5. The cutting tool mounting assembly of claim 1, wherein the sensor element comprises one of a magnetic field sensor, a fluorescent sensor, a color camera, a chemical sensor, a radiation detector, or any combination thereof.

6. The cutting tool mounting assembly of claim 1, wherein the bolster includes a convex-shaped head portion formed with a radius, R1, a collar portion and a tapered shank portion.

7. The cutting tool mounting assembly of claim 1, wherein the socket is formed with a side wall, a bottom wall, and a radius blend formed with a radius, R2, extending between the side wall and the bottom wall.

8. A rotatable cutting tool for a cutting tool mounting assembly, the rotatable cutting tool comprising:

a cutting tool body having an axial forward end and an axial rearward end, a head portion axially rearward of the axial forward end having a base portion, a collar portion axially rearward of the head portion, and a shank portion axially rearward of the collar portion and axially forward of the axial rearward end;

a cutting tip at the axial forward end of the cutting tool body;

a target for emitting a signal representative of wear of the cutting tip;

a sensor element at a spaced apart location with respect to the target for detecting the signal emitted by the target; and a data recording and data transmitting device for recording data from the sensor element and for wirelessly communicating a signal to a processor and/or a display device, wherein the target comprises one of a magnetic material, a fluorescent material, a coloring material, a labeling chemical gases/liquids material, a radioactive material, or any combination thereof, wherein the sensor element comprises one of a magnetic field sensor, a fluorescent sensor, a color camera, a chemical sensor, a radiation detector, or any combination thereof, and wherein the target is mounted either at an axial forward end of the base portion proximate a bolster and the cutting tip, located internally in the cutting tip or interspersed into the cutting tip.

9. The rotatable cutting tool of claim 8, wherein the signal emitted by the target is wirelessly detected by the sensor element.

10. The rotatable cutting tool of claim 8, wherein the bolster at least partially received in the head portion, the bolster including a socket.

11. The rotatable cutting tool of claim 10, wherein the cutting tip is at least partially received in the socket of the bolster.

12. The rotatable cutting tool (12) of claim 10, wherein the bolster includes a convex-shaped head portion formed with a radius, R1, a collar portion and a tapered shank portion.

13. The rotatable cutting tool of claim 10, wherein the socket is formed with a side wall, a bottom wall, and a radius blend formed with a radius, R2, extending between the side wall and the bottom wall.

14. The rotatable cutting tool of claim 13, wherein the bottom wall of the socket is planar.

15. The rotatable cutting tool of claim 13, wherein the cutting tip includes a conical head portion, a collar portion and an axially rearward portion.

16. The rotatable cutting tool of claim 15, wherein the collar portion and the axially rearward portion of the cutting tip is received within the socket of the bolster.

17. The rotatable cutting tool of claim 16, wherein the axially rearward portion of the cutting tip is planar.

* * * * *